United States Patent [19]

Blauvelt et al.

[11] Patent Number: 5,453,868
[45] Date of Patent: * Sep. 26, 1995

[54] SUPPRESSION OF NOISE AND DISTORTION IN FIBER-OPTIC SYSTEMS

[75] Inventors: Henry A. Blauvelt, San Marino; John S. Frame, Torrance; Amnon Yariv, San Marino; David B. Huff, Downey, all of Calif.

[73] Assignee: Ortel Corporation, Alhambra, Calif.

[*] Notice: The portion of the term of this patent subsequent to Jun. 30, 2011 has been disclaimed.

[21] Appl. No.: 284,369

[22] Filed: Aug. 2, 1994

Related U.S. Application Data

[63] Continuation of Ser. No. 887,533, May 22, 1992.

[51] Int. Cl.$^6$ ........................................ H04B 10/12
[52] U.S. Cl. ........................ 359/173; 359/161; 359/188; 372/32
[58] Field of Search ............... 372/26, 28, 32, 372/25, 82, 89; 359/154, 161, 173, 180–188

[56] References Cited

U.S. PATENT DOCUMENTS

| | | | |
|---|---|---|---|
| 3,820,037 | 6/1974 | Corcoran | 331/94.5 |
| 4,011,403 | 3/1977 | Epstein et al. | 358/209 |
| 4,357,713 | 11/1982 | Blackburn et al. | 455/609 |
| 4,501,022 | 2/1985 | Oswald | 455/601 |
| 4,556,980 | 12/1985 | Smith et al. | 372/28 |
| 4,611,352 | 9/1986 | Fujito et al. | 455/609 |
| 4,660,206 | 4/1987 | Halmos et al. | 372/28 |
| 4,666,295 | 5/1987 | Duvall, III et al. | 356/5 |
| 4,794,608 | 12/1988 | Fujita et al. | 372/50 |
| 4,817,099 | 3/1989 | Javan | 372/32 |
| 4,841,529 | 6/1989 | Javan | 372/32 |
| 4,856,010 | 8/1989 | Wissman et al. | 372/32 |
| 4,932,775 | 6/1990 | Wissman et al. | 356/5 |
| 4,992,754 | 2/1991 | Blauvelt et al. | 330/149 |
| 5,101,456 | 3/1992 | Islam | 385/27 |
| 5,115,440 | 5/1992 | Gysel et al. | 372/38 |
| 5,210,633 | 9/1990 | Trisno | 359/194 |
| 5,222,089 | 6/1993 | Huber | 372/26 |

FOREIGN PATENT DOCUMENTS

| | | |
|---|---|---|
| 475376A2 | 9/1991 | European Pat. Off. |
| 58-009446 | 4/1983 | Japan. |
| 224134 | 8/1985 | Japan. |

OTHER PUBLICATIONS

S. Wu, A. Yariv, H. Blauvelt, N. Kwong, "Theoretical and Experimental Investigation of Phase Noise by Rayleigh Scattering in Optical Fibers", Applied Physics Letters, vol. 59, No. 10, 2 Sep. 1991, pp. 1156–1158.

Darcie, et al., "Fiber–Reflection–Induced Impairments in Lightwave AM–VSB CATV Systems" *Journal of Lightwave Technology*, vol. 9, No. 8, Aug. 1991, pp. 991–995.

Lidgard, et al., "Generation and Cancellation of Second–Order Harmonic Distortion in Analog Optical Systems by Interferometric FM–AM Conversion", *IEEE Photonics Technology Letters*, vol. 2, No. 7, Jul. 1990, pp. 519–521.

Hemmi et al. "Prechirp Technique as a Linear Dispersion (List continued on next page.)

*Primary Examiner*—Leslie Pascal
*Attorney, Agent, or Firm*—Christie, Parker & Hale

[57] ABSTRACT

Noise and distortion due to scattering and reflection in a fiber-optic communications system are suppressed by modulating the optical frequency of (chirping) a laser light source to broaden the spectrum of the laser light output. The broader spectrum spreads the noise produced by an unchirped source over a broader band. A noise and distortion suppression system includes a chirp signal generator coupled to the signal path of an RF input signal carrying information to modulate the laser optical output. In some cases, the frequency of the chirp generating signal may result in second-order intermodulation products falling within the information band. In such cases, the RF input signal is predistorted to offset the expected distortion products.

38 Claims, 6 Drawing Sheets

OTHER PUBLICATIONS

Compensation for Multi–Gigabit Long–span IM–DD Optical Transmission Systems," International Conference on Communications 91 vol. 3, 26 Jun. 1991, pp. 1222–1227.

Hirose et al. "Supression of Stimulated Brillouin Scattering and Brillouin Crosstalk by Frequency–sweeping spread–spectrum scheme," Journal of Optical Communications vol. 12, No. 3, Sep. 1991, pp. 82–85.

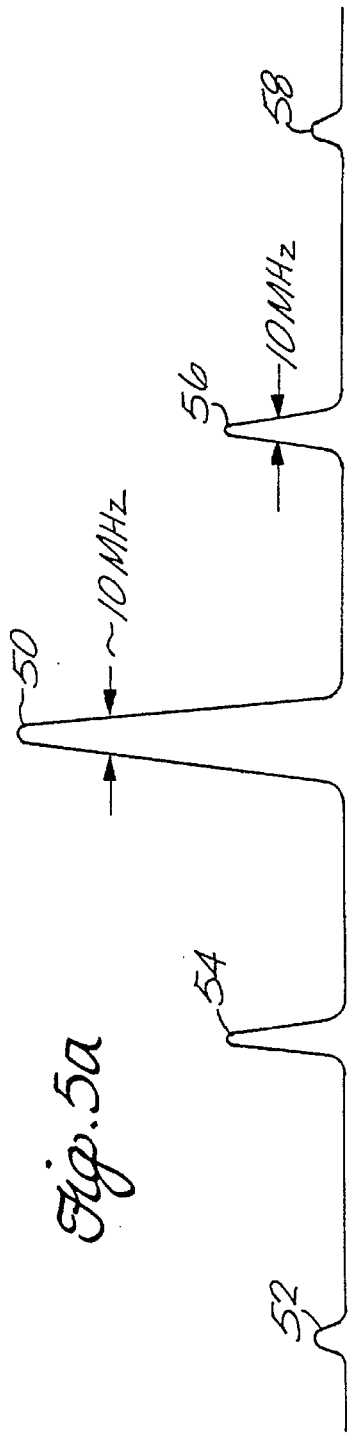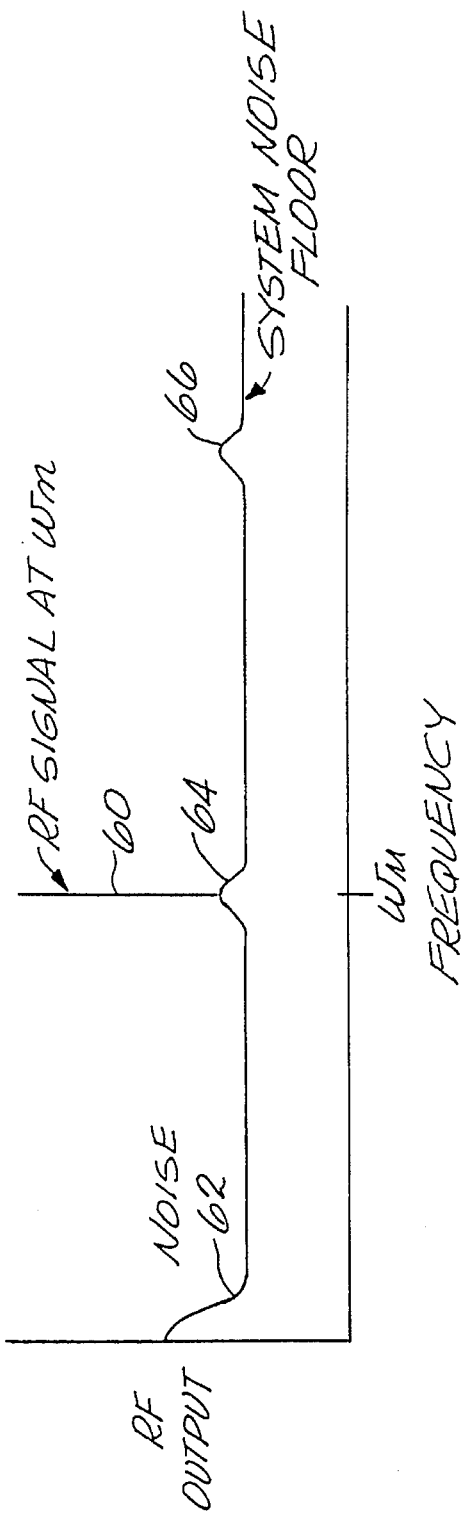

SUPPRESSION OF NOISE AND DISTORTION IN FIBER-OPTIC SYSTEMS

CROSS REFERENCE TO RELATED APPLICATION

This is a continuation of application Ser. No. 07/887,533 filed May 22, 1992.

FIELD OF THE INVENTION

The invention relates generally to fiber-optic communications systems and, more particularly, to an apparatus and method for suppressing noise and distortion caused by scattering or reflection of light within optical fibers.

BACKGROUND OF THE INVENTION

Directly modulating the analog intensity of a semiconductor laser with an electrical signal is considered among the simplest methods known in the art for transmitting optical signals carrying information, such as sound and video signals, through optical fibers. Such optical signals, however, are susceptible to noise and distortion.

Much of the noise which degrades signal quality is produced by light scattering and reflection effects within the optical fiber. Rayleigh scattering occurs due to localized variations in density within optical fibers, which are inherent to glass. Reflection occurs due to discrete components, such as, for example, connectors, splices, and detectors.

Both scattering and reflection contribute to noise generated at the source and noise received at the end of the system. Optical feedback due to discrete reflectors or distributed reflection from Rayleigh backscattering in the glass fiber can cause instabilities in the light source, including optical power fluctuations and distortion instabilities. Such instabilities degrade the quality of the transmitted analog signal. Furthermore, if a portion of the signal is twice reflected due to discrete reflectors, Rayleigh backscattering, or a combination of the two, interferometric noise and distortion will be produced at the receiving end of the link from the mixing in the photodetector of directly transmitted light with light that has been twice reflected. These effects are particularly detrimental to systems such as satellite communications, CATV, and mobile telecommunications networks which require a high signal-to-noise ratio and a high degree of linearity for multi-channel transmission.

Due to the fundamental properties of glass fibers, Rayleigh scattering is a largely unavoidable effect. Noise due to discrete reflectors can be minimized by using high-quality components, but this is not always practical. In many cases, systems must work on previously installed fiber links which include high-reflection components.

The present invention, accordingly, is addressed to a low-cost apparatus and method for suppressing noise and distortion due to scattering and reflections.

SUMMARY OF THE INVENTION

Thus, in practice of this invention according to a presently preferred embodiment, a system for suppressing noise and distortion is used in a fiber-optic communications system having a source laser connected to optical fiber and an RF input signal with an informational bandwidth for modulating the laser. The noise and distortion suppression system includes a generator for producing a chirp generating signal and means for combining the chirp generating signal and the RF input signal. The resulting signal is applied to the laser for introducing an optical signal to the fiber. The optical signal is detected at a remote receiver which produces an RF output signal.

The chirp generating signal modulates the optical frequency of (chirps) the laser output, thereby broadening the laser optical spectrum. This broadened spectrum spreads interferometric noise and distortion in the RF output signal over a wide interval and pushes much of the noise and distortion outside the system bandwidth where it will not affect signal quality.

However, in some cases, when the chirp generating signal is combined with the RF signal, second-order intermodulation products due to laser nonlinearities may form which distort the information component (amplitude) of the RF signal. To cancel this distortion in such cases, an alternate embodiment of the present invention includes a predistorter which is tuned to apply a predistortion signal to the system which offsets the expected second-order intermodulation products.

BRIEF DESCRIPTION OF THE DRAWINGS

These and other features and advantages of this invention will be better understood and fully appreciated by reference to the following detailed description when considered in conjunction with the accompanying drawings wherein:

FIG. 5a is a graphical representation of the optical spectrum (amplitude vs. frequency) of the system of FIG. 1;

FIG. 5b is a graphical representation of the RF output signal spectrum of (RF output v. frequency) of the system of FIG. 1;

DETAILED DESCRIPTION OF THE INVENTION

Figure 1:
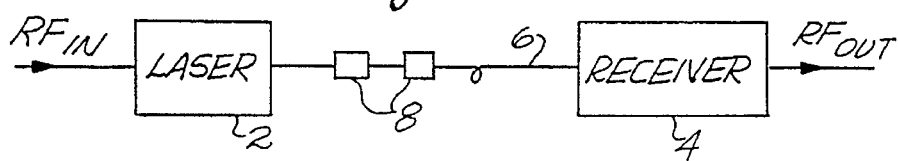
FIG. 1 is a block diagram of a conventional fiber-optic system.

In an exemplary embodiment, the present invention is used in a conventional fiber-optic system, as shown in FIG. 1. The system includes a laser 2 and a receiver 4 coupled by an optical fiber link 6 with optical connectors 8. In operation, an RF input signal is used to intensity modulate the output of the laser. In addition to the intensity modulation of the optical signal, all lasers exhibit optical frequency modulation to some extent caused by the RF input signal. The optical signal is transmitted by the laser through the link. The receiver detects the optical signal and accordingly generates an RF output signal substantially similar to the RF input signal.

Assuming an RF input signal $I_m \cos \omega_m t$, in which $\omega_m$ is the modulation frequency and $I_m$ is the amplitude, the laser will generate an optical spectrum, as shown in FIG. 5a. As is well known, sidebands 52, 54, 56, 58 appear offset from the main optical carrier 50. The number of sidebands and the amplitude of each sideband depends on the amount of amplitude modulation and frequency modulation of the laser.

Noise and distortion in conventional fiber-optic systems degrade the overall performance of the system. Optical mixing of directly transmitted light from the laser with doubly-reflected light produces noise bands 62, 64, 66 in the RF output near DC and near harmonics of the modulation frequency $\omega_m$, as shown in FIG. 5b. These noise bands, also known as interferometric noise, degrade signal quality. For a more detailed description of interferometric noise caused by double-backscattering, refer to an article by S. Wu, A. Yariv, H. Blauvelt, and N. Kwong, entitled "Theoretical and Experimental Investigation of Conversion of Phase Noise to Intensity Noise by Rayleigh Scattering in Optical Fibers" appearing in the *Applied Physics Letters*, Vol. 59, No. 10, pp. 1156–1158, September 1991 and an article by T. E. Darcie, G. E. Bodeep, and A. A. M. Saleh, entitled "Fiber-Reflection-Induced Impairments in Lightwave AM-VSB CATV Systems", appearing in the *Journal of Lightwave Technology*, Vol. 9, No. 8, pp. 991–995, August 1991.

Figure 2:
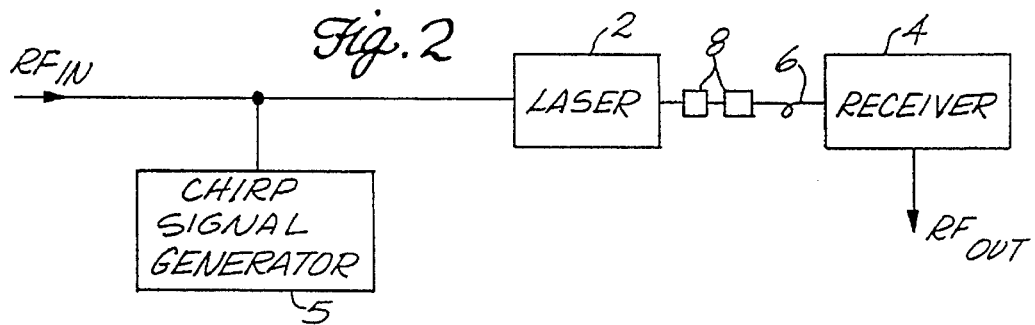
FIG. 2 is a block diagram showing a presently preferred embodiment of a system for suppressing noise and distortion in the fiber-optic system of FIG. 1.
Figure 5C:
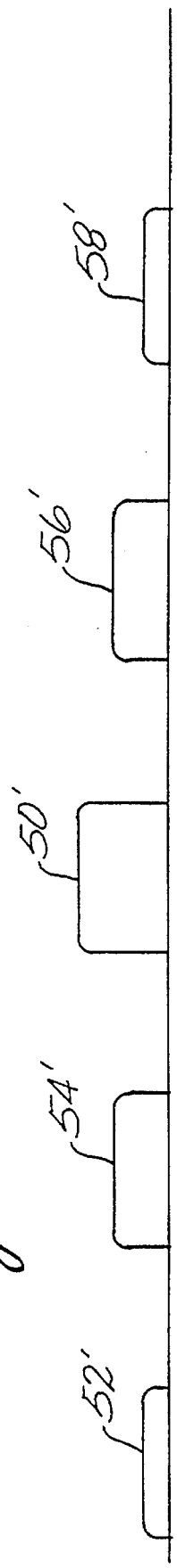
FIG. 5c is a graphical representation of the optical spectrum of the system of FIG. 2.
Figure 5D:
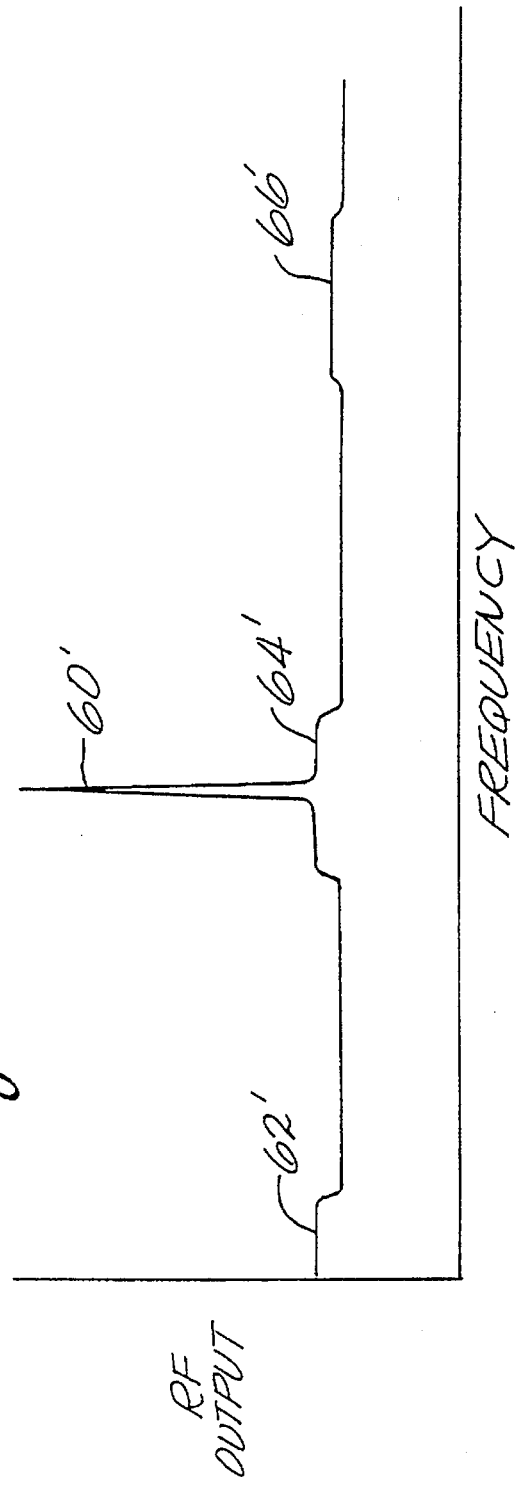
FIG. 5d is a graphical representation of the RF output spectrum of the system of FIG. 2.

Referring to FIG. 2, a system for suppressing noise and distortion according to one embodiment of the present invention includes a chirp signal generator 5 coupled to an RF input path to the laser 2. The laser is coupled to the receiver 4 by the optical fiber link 6 having connectors 8. The chirp signal generator produces a chirp generating signal which is used to modulate the optical frequency of the laser output. The chirp generating signal may be a simple sine wave having a characteristic frequency, or it may be a more complex signal having a frequency spectrum, for example, a frequency modulated sine wave. Assuming a sinusoidal chirp generating signal, $I_c \cos \omega_c t$, and an RF input, $I_m \cos \omega_m t$, the combined input to the laser will be $I_m \cos \omega_m t + I_c \cos \omega_c t$. The combined input broadens the spectrum of the optical carrier 50' and sidebands 52', 54', 56', 58', as shown in FIG. 5c. The broadened spectrum effectively spreads noise 62', 64', 66' in the RF output signal from the receiver over wider frequency ranges, as shown in FIG. 5d. In most systems, the spreading of noise over a wider frequency interval makes the system more desirable. In many systems, much of the noise can be pushed outside the system bandwidth.

Figure 5E:
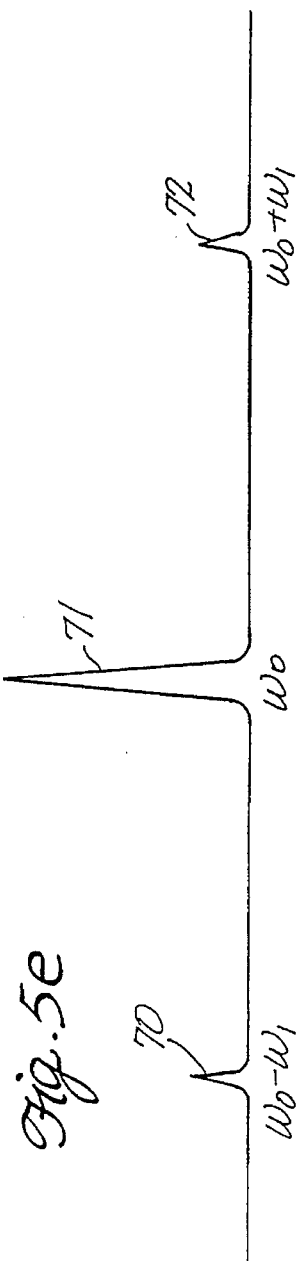
FIG. 5e is another graphical representation of the optical spectrum of the system of FIG. 1.
Figure 5F:
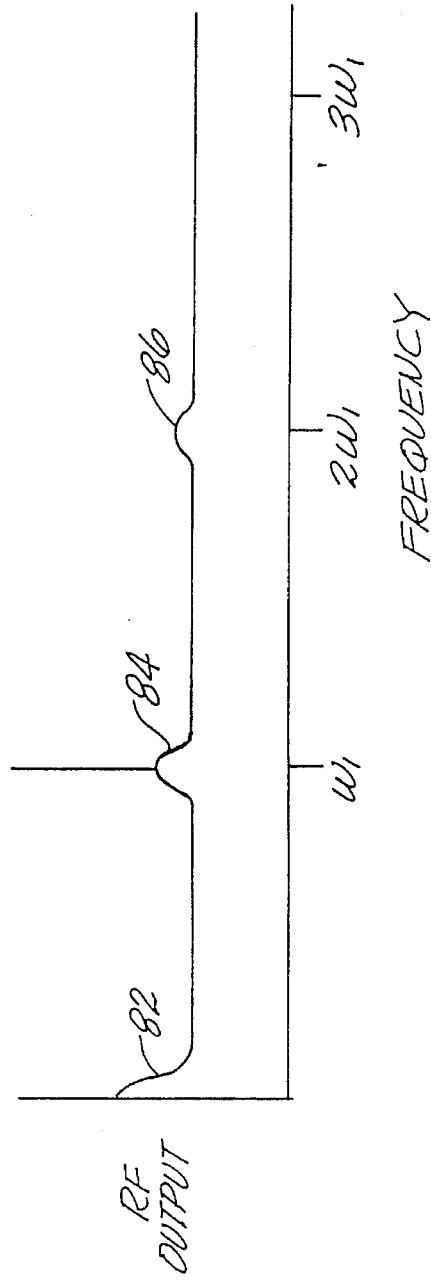
FIG. 5f is another graphical representation of the RF output spectrum of FIG. 1.

Referring again to FIG. 1, distortion in fiber-optic systems can also be caused by closely-spaced optical connectors 8 which cause discrete reflections. Assuming an RF input signal $\cos \omega_1 t$ and an optical carrier frequency $\omega_O$, the resulting optical spectrum will have sidebands 70, 72, as shown in FIG. 5e. The number of sidebands and the amplitude of each sideband depends on the amount of amplitude modulation and frequency modulation of the laser. The corresponding undesirable noise and distortion products 82, 84, 86 in the RF output are shown in FIG. 5f. When the time delay associated with the double reflections is short compared to the laser coherence time, optical mixing results in discrete distortion products. When the time delay is long compared to the coherence time, the optical mixing results in noise bands. FIG. 5f shows an intermediate case with both discrete distortion products and noise bands. For a more detailed description of distortion generation due to optical mixing, refer to an article by A. Lidgard and N. A. Olsson, entitled "Generation and Cancellation of Second-Order Harmonic Distortion in Analog Optical Systems by Interferometric FM-AM Conversion", appearing in the *IEEE Photonics Technology Letters*, Vol. 2, No. 7, pp. 519–521, July, 1990.

Figure 5G:
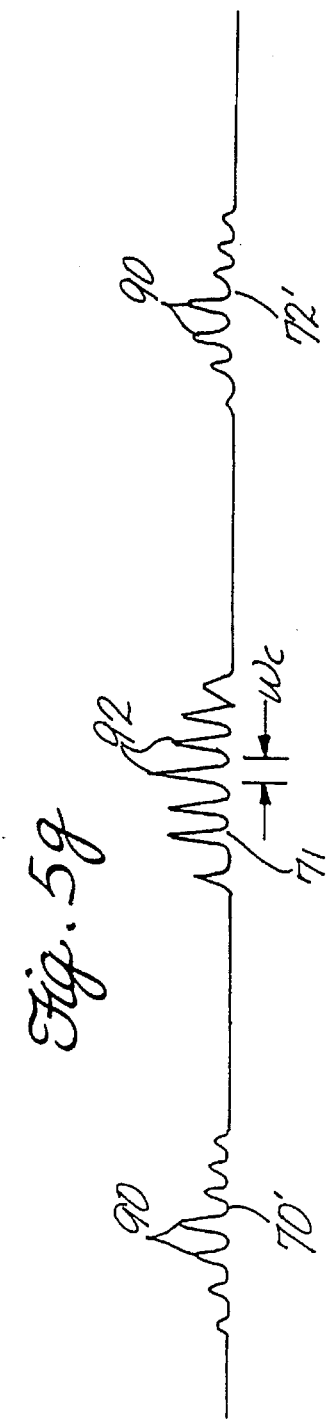
FIG. 5g is another graphical representation of the system of FIG. 2.
Figure 5H:
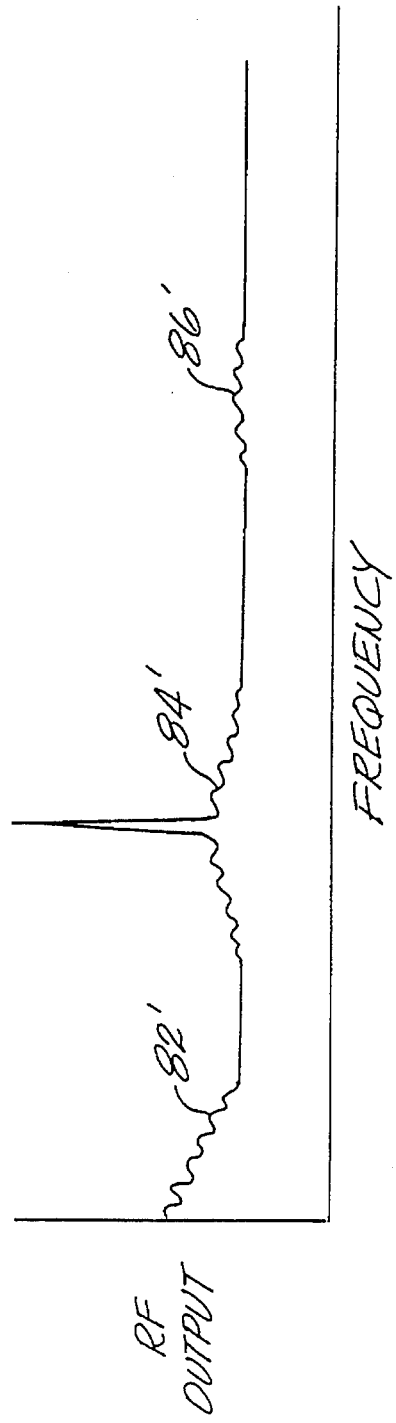
FIG. 5h is another graphical representation of the RF output spectrum of the system of FIG. 2.

By adding a chirp generating signal using the apparatus in FIG. 2, the optical carrier 71' and sidebands 70', 72' are split into relatively low amplitude subbands 90, 92 separated by the chirp generating signal frequency $\omega_c$, as shown in FIG. 5g. It should be noted that if $\omega_c$ is small compared to the laser linewidth, the subbands will overlap, as shown in FIG. 5c. Using this technique, the total noise and distortion of the system is not changed, but the noise and distortion products 82', 84', 86' in the RF output are spread out over a wider frequency interval, as shown in FIG. 5h, making it less objectionable for most applications.

In addition to distortion due to optical mixing, some lasers exhibit second-order distortion due to the combination of the chirp generating signal and the RF input. To distinguish this from distortion due to optical mixing, this will be referred to as laser distortion. Intermodulation products due to laser distortion can have a detrimental effect on signal quality if they fall within the information band of the RF signal. The effect of these second-order laser intermodulation products can be minimized by two techniques. First, the RF signal can be predistorted to offset the laser distortion products. Second, a spread-spectrum chirp generating signal may be used, such as a frequency-modulated carrier, filtered noise, or a pseudo-random digital signal. This does not reduce overall laser distortion power, but spreads the laser distortion over a wider interval.

Figure 3:
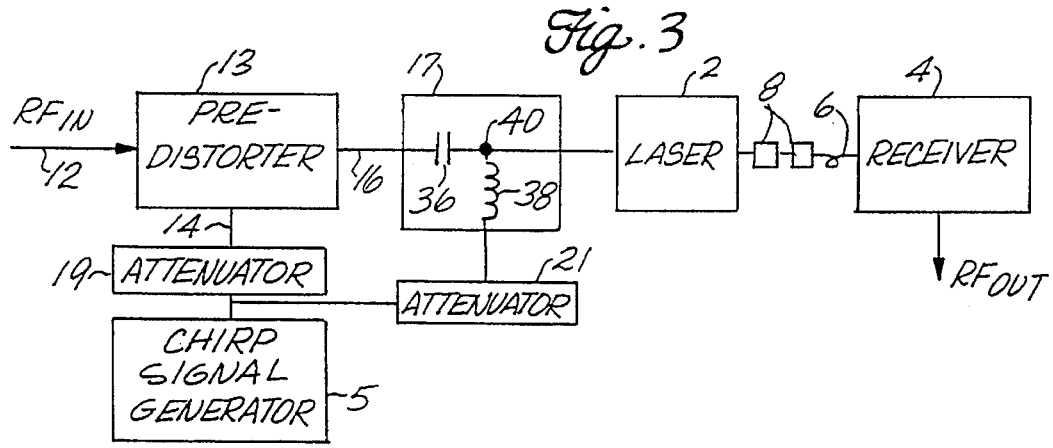
FIG. 3 is an alternate embodiment of FIG. 2 showing a predistorter.

An alternate embodiment of a noise and distortion suppression system having a predistorter for canceling second-order laser intermodulation products is shown in FIG. 3. The system includes a predistorter 13 connected in series with a diplex filter 17 and a source laser 2 which generates optical signals for transmission through an optical fiber link 6 having connectors 8 to a remote receiver 4. The chirp generating signal from the generator 15 is separately applied to both the predistorter and the diplex filter through first and second attenuators, 19, 21. Undesirable laser distortion due to the combination of the chirp generating signal and the RF input signal can be corrected by predistorting the RF signal at the predistorter such that the distortion generated by the laser is canceled.

The predistorter 13 has an RF input 12 to which the RF signal is applied and a laser chirp generating signal input 14 to which a portion of chirp generating signal is applied. The amount of predistortion is controlled through, for example, the first variable attenuator 19. The output of the first attenuator is coupled to the predistorter input 14. The RF signal has an information component containing the information, such as cellular telephone or video signals, for example, to be transmitted optically by laser. The information component has an informational bandwidth. As a function of the chirp generating signal input from the first attenuator, the predistorter produces an intermodulation distortion signal which is added to the RF signal at output 16.

The signal from the output of the predistorter feeds into a high pass filter capacitor 36 within a diplex filter 17. The chirp generating signal from the second attenuator 21 is applied across the low pass filter inductor 38. The signal is attenuated by an appropriately valued resistor, for example, within the second attenuator to ensure that the laser is not driven out of its linear region. The chirp generating signal combines with the output of the predistorter at network node 40. The resulting signal from the diplex filter is applied as drive current to the laser. The intermodulation distortion generated in the laser by the combination of the chirp generating signal and RF input signal is equal in amplitude and opposite in sign to that generated by the intermodulation distortion signal from the predistorter. The net effect is to cancel the intermodulation distortion present in the RF output from the receiver.

To set the amount of predistortion at the optimum level for laser distortion suppression, the system is initiated with the predistorter set to generate negligible distortion, i.e., the first attenuator is set at maximum attenuation. A chirp generating signal level is selected by using the second attenuator to minimize noise and distortion in the RF output signal. If this choice of signal causes in-band laser distortion due to the chirp generating signal, the predistorter level is adjusted until the in-band laser distortion is effective canceled. To achieve distortion cancellation, it is sometimes required to invert the chirp generating signal that is applied to the predistorter relative to the signal applied to the diplex filter.

Figure 3A:
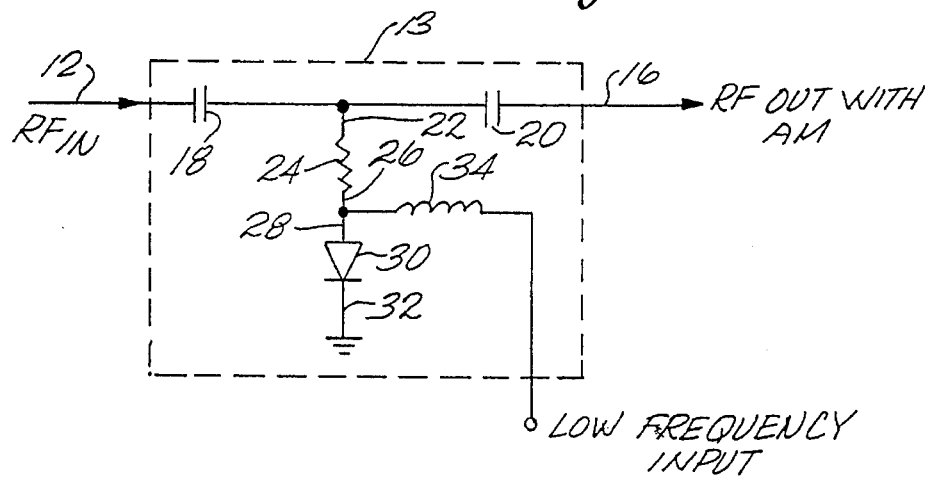
FIG. 3a is a schematic diagram exemplifying certain components of the predistorter in FIG. 3.

Referring to FIG. 3*a*, an exemplary predistorter suitable for use with the system of FIG. 3 comprises an amplitude modulator 13 which creates intermodulation products which are equal in amplitude, but opposite in sign, to the intermodulation products produced by laser distortion. The level of the intermodulation products produced by the predistorter is proportional to the level of chirp generating signal input to the predistorter.

The amplitude modulator has its RF input 12 and output 16 capacitively coupled by an input capacitor 18 and an output capacitor 20. The capacitors block low-frequency signals, but allow RF signals to pass. A first terminal 22 of a resistor 24 is connected between the two capacitors. The second terminal 26 of the resistor is connected to one terminal 28 of a PIN diode 30. The other terminal 32 of the PIN diode is connected to ground. The PIN diode 30 and resistor 24 together act as a current controlled variable resistor which draws power from the RF signal dependent on the current across the PIN diode. The chirp generating signal, applied to a second modulator input 14 across an inductor 34 which has one terminal connected between the resistor 24 and the PIN diode, controls the current across the PIN diode. Using this predistorter, the amount of predistortion can also be controlled by adjusting the bias current through the PIN diode.

The system of FIG. 3 having a predistorter as shown in FIG. 3*a* is suitable for systems which use a relatively low-frequency chirp generating signal in the range from approximately 1 KHz to 200 KHz. In this frequency range, laser distortion due to the chirp generating signal and the RF signal can generally be characterized as amplitude modulation. Conversely, higher frequency chirp generating signals in the megahertz range, for example, may cause laser distortion that can be characterized as phase modulation of the RF output in addition to amplitude modulation. In such cases, the predistorter shown in FIG. 3*a* may not be suitable, and a more elaborate predistorter may be required.

Figure 4:
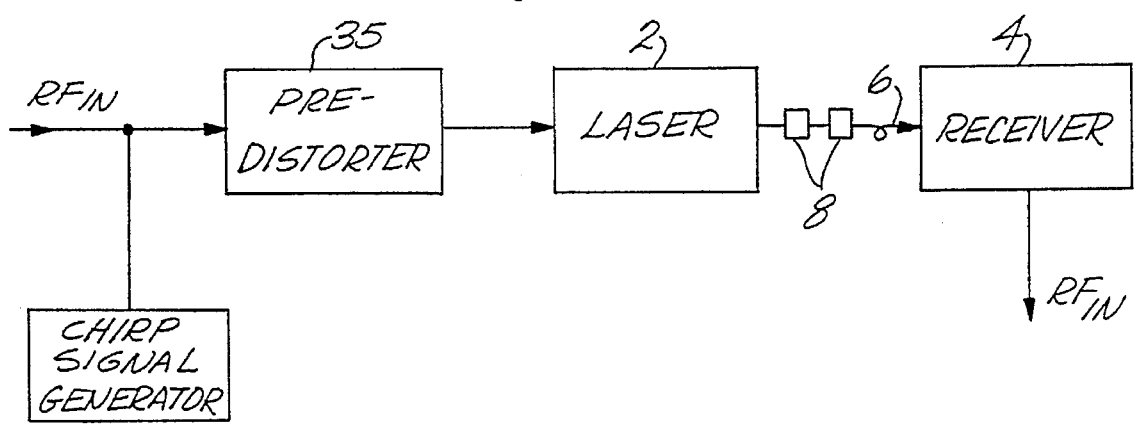
FIG. 4 is an alternate embodiment of the system shown in FIG. 3.

A further embodiment of a noise and distortion suppression system with a predistorter suitable for use with relatively high-frequency chirp generating signals is shown in FIG. 4. The circuit includes a chirp signal generator 5 coupled to the input path for an RF input signal to a predistorter 35. The chirp signal generator produces a chirp generating signal which combines with the RF input signal to the predistorter. The predistorter generates intermodulation distortion to cancel any in-band distortion generated by the laser. A suitable predistorter for the system of FIG. 4 is disclosed in U.S. Pat. No. 4,992,754, issued to Blauvelt et al., the contents of which are hereby incorporated by reference.

It should be noted that predistortion is not always necessary to preserve the information carried on the RF signal. Predistortion is only required when the combination of the chirp generating signal and the RF input signal causes in-band laser distortion which is unacceptable for a particular system. In-band laser distortion of the information component of the RF signal depends on the frequency of the chirp generating signal compared to the informational bandwidth of the information component of the RF signal.

In the case of a constant amplitude sine wave, if the chirp generating signal has a frequency lower than the lowest frequency of the information band and a frequency larger than the informational bandwidth, second-order laser intermodulation products caused by the combination of the RF signal and the chirp generating signal will fall out of the informational bandwidth and will not affect the accuracy of the information. Similarly, no second-order laser distortion will occur if the chirp generating signal frequency is greater than the highest frequency of the information band, and no difference between the chirp generating signal frequency and any frequency within the informational bandwidth falls within the information band. In these cases, no predistortion is necessary to prevent distortion of the information.

It should be apparent to one skilled in the art that if a more complex chirp generating signal having a frequency spectrum is used, all of the frequencies within the spectrum would be taken into account to determine whether predistortion is necessary. For instance, predistortion would not be necessary if no frequency in the chirp generating signal has any second-order intermodulation products with any frequency in the information band which fall within the bandwidth of the information band.

For example, assume that the band of the signal is from 500 to 550 MHz. The chirp generating signal may have a frequency of 100 MHz. This modulating frequency does not interfere directly with any in-band frequency. Furthermore, the second-order intermodulation products with the information component of the signal are less than 450 MHz and higher than 600 MHz, which are also outside the band of the signal.

It may not always be feasible, however, to use a chirp generating signal which does not distort the information on the RF signal. If the frequency of the chirp generating signal is less than the informational bandwidth, distortion may occur due to intermodulation products within the information band, and it may be necessary to predistort the RF signal to preserve the accuracy of the information.

For example, assume that the band of the signal is from 50 to 550 MHz (characteristic of many CATV networks). A 100 MHz chirp generating signal would be within the signal band and, therefore, unsuitable. Instead, one may modulate with a chirp generating signal having a frequency of 100 KHz, for example. This is clearly outside the band, so does not interfere directly. It has, however, intermodulation products which are in-band. Therefore, the RF signal should be predistorted to preserve the information on the signal.

To be effective, the chirp generating signal must not be of too low a frequency. As noted, noise and distortion is caused by the mixing of doubly transmitted light with directly transmitted light. If the chirp generating signal induces no significant change in the instantaneous optical frequency during the delay for the doubly reflected light to mix with directly transmitted light, the chirp will not be effective. The maximum time delay that can be expected from optical fiber links is of the order of a few hundred microseconds. As a practical lower limit, a chirp generating signal of 1 KHz, for example, would be sufficient to suppress the noise and distortion for this time delay. Other systems might have time delays which are significantly shorter, resulting in a higher minimum frequency for the chirp generating signal.

For chirp generating signals with frequencies less than the bandwidth of the information signal, a frequency of up to 200 KHz is presently preferred. That is about the maximum rate that effective thermal chirping occurs. Below 200 KHz, the laser chirp is primarily due to thermal effects, and the chirp parameter (having units of MHz/mA) is about ten times larger than for higher chirp generating frequencies. It is particularly preferred that the chirp generating signal frequency is in the range of from 10 to 200 KHz. With low frequency chirping signals, a smaller amplitude is required to produce the desired noise and distortion suppression.

In still another embodiment, it is preferred that the frequency of the chirp generating signal is greater than the bandwidth of the information signal and less than the lowest frequency of the band. As the frequency of the chirp generating signal is increased, however, the circuits required to modulate and predistort the RF signal before it reaches the source laser become more complicated and costly. In many instances, the effectiveness of the chirping technique depends on the FM modulation index. This index is the ratio of the optical frequency deviation to the chirp generating frequency. As a practical upper limit, the frequency of the chirp generating signal preferably should not exceed 300 MHz.

In some cases, however, it may be necessary to chirp the laser with a chirp generating signal frequency greater than the highest frequency of the information band. This would be necessary, for example, when a discrete reflector is close to the source laser, requiring a high-frequency signal to chirp the laser optical frequency before the reflected light returns to the laser.

It should be apparent to one skilled in the art that if a more complex chirp generating signal having a frequency spectrum is used, each of the frequencies within the spectrum would be taken into account to determine whether the signal is sufficient to reduce noise and distortion in a particular system.

In any of these embodiments, it is preferred that the chirp generating signal amplitude remain constant for reducing the complexity of the system. If the chirp generating signal amplitude varies, the effectiveness of the avoidance of noise problems would be reduced, since the lower amplitude portions of the chirp generating signal would cause less change in the frequency of the light and result in less suppression of noise and distortion due to optical mixing of doubly reflected light and directly transmitted light.

In-band laser distortion products may be avoided without the need for predistortion by using still another embodiment of the present invention. Referring again to FIG. 2, the chirp generating signal generators may include apparatus to produce spread-spectrum chirp generating signals. Spread-spectrum chirp generating signals are complex signals with frequency spectra containing a range of frequencies as opposed to a single characteristic frequency. Such signals are used to optical frequency modulate the laser, producing second-order intermodulation products which are spread across the band. One suitable spread-spectrum generator is a frequency modulated tone, for example, with a frequency spectrum extending from 10 KHz to 100 KHz. Such a signal may be used to transfer information while also causing optical frequency modulation. With this generator, the laser distortion power is distributed over the frequency interval of 10 to 100 KHz from the carrier and the distortion is more tolerable in most systems.

Another suitable spread-spectrum generator is a filtered noise generator. Such a generator, for example, may include a noise diode which generates white noise which is amplified and suitably filtered. In effect, one introduces out-of-band noise to modulate the laser output for the purpose of reducing in-band noise and distortion of the RF output signal from the receiver.

Still another suitable spread-spectrum generator is a pseudo-random digital pattern noise generator.

Many variations and modifications will be apparent to those skilled in the art without departing from the spirit and scope of the invention. For example, there may be various modifications of chirp generating signals which may or may not carry information. Various modifications can also occur to provide a circuit for combining a chirp generating signal with an RF input signal. Numerous techniques may also be used to optical frequency modulate the laser optical output, including, for example, the use of thermal, mechanical, and electro-optical means. Similarly, various modifications may occur for predistorting the RF signal. Because many circuits may be implemented to carry out such operations, the invention may be practiced otherwise than as specifically described.

What is claimed is:

1. A noise and distortion suppression system for suppressing noise and distortion in a fiber-optic communications system having a semiconductor source laser connected to an optical fiber and an RF input signal with an information frequency band for modulating the laser, the system comprising:
   means for applying a combination RF signal and chirp generating signal having at least one frequency to the source laser for modulating the laser and for changing the instantaneous frequency of light from the laser for minimizing noise and distortion due to reflections.

2. The noise and distortion suppression system of claim 1 wherein the chirp generating signal has a single frequency.

3. The noise and distortion suppression system of claim 2, wherein the chirp generating signal has a frequency less than the lowest frequency in the information band.

4. The noise and distortion suppression system of claim 3, wherein the chirp generating signal has a frequency which, when combined with any frequency in the information band, causes no second-order intermodulation products which fall within the bandwidth of the information band.

5. The noise and distortion suppression system of claim 2, wherein the chirp generating signal has a frequency greater than the highest frequency in the information band.

6. The noise and distortion suppression system of claim 5, wherein the chirp generating signal has a frequency which, when combined with any frequency in the information band, causes no second-order intermodulation products which fall within the bandwidth of the information band.

7. The noise and distortion suppression system of claim 2, wherein the chirp generating signal comprises a constant amplitude sine wave.

8. The noise and distortion suppression system of claim 1, wherein the chirp generating signal comprises a plurality of frequencies.

9. The noise and distortion suppression system of claim 8, wherein the chirp generating signal has a frequency spectrum which, when combined with any frequency in the information band, causes no second-order intermodulation products which fall within the bandwidth of the information band.

10. The noise and distortion suppression system of claim 8, wherein the chirp generating signal comprises a constant amplitude frequency modulated sine wave.

11. The noise and distortion suppression system of claim 8, wherein the chirp generating signal comprises filtered noise.

12. The noise and distortion suppression system of claim 8, wherein the chirp generating signal comprises pseudo-random digital signals.

13. The noise and distortion suppression system of claim 1, wherein the chirp generating signal has a frequency in the range from 1 KHz to 300 MHz.

14. The noise and distortion suppression system of claim 1, wherein the chirp generating signal has a frequency in the range from 1 KHz to 200 KHz.

15. The noise and distortion suppression system of claim 1, further comprising means for predistorting the RF signal so that laser distortion is canceled.

16. A low noise fiber-optic communications system comprising:
a semiconductor laser having an RF input for producing a modulated optical spectrum;
a receiver for producing an RF output signal with an information frequency band substantially similar to an information band of the RF input signal;
an optical fiber coupling the laser to the receiver;
means for generating a chirp generating signal;
means for applying the chirp generating signal to the laser for minimizing noise and distortion due to reflections; and
means for predistorting the RF input signal so that laser distortion of the information component of the RF output signal created by the chirp generating signal is canceled.

17. The system of claim 16, wherein the means for generating a chirp generating signal comprises means for generating a constant amplitude sine wave.

18. The system of claim 16, wherein the means for generating a chirp generating signal comprises means for generating a constant amplitude frequency modulated signal.

19. The system of claim 16, wherein the means for generating a chirp generating signal comprises means for generating filtered noise.

20. The system of claim 16, wherein the means for generating a chirp generating signal comprises means for generating pseudo-random digital signals.

21. The system of claim 16, wherein the chirp generating means generates a chirp generating signal having a frequency which is less than the bandwidth of the RF output signal information band.

22. The system of claim 16, wherein the chirp generating means generates a chirp generating signal having a frequency in the range from 1 KHz to 300 MHz.

23. The system of claim 16, wherein the chirp generating means generates a chirp generating signal having a frequency in the range from 1 KHz to 200 KHz.

24. The system of claim 16, wherein the means for predistorting the RF signal comprises an amplitude modulator.

25. The system of claim 24, wherein the amplitude modulator comprises an input for receiving the chirp generating signal and an output coupled to a signal path of the RF input signal for amplitude modulating the RF input signal.

26. A low noise fiber-optic communications system comprising:
a semiconductor laser;
an input electrical signal path connected to the laser for modulating the laser with an information component having an informational frequency bandwidth; and
means for applying a signal to the laser for changing the frequency of light from the laser for minimizing noise and distortion due to reflections without distorting the information component.

27. The system of claim 26 wherein the means for applying a signal comprises an oscillator having a modulation frequency lower than the lowest frequency of the information component.

28. The system of claim 26 wherein the means for applying a signal comprises an oscillator having a modulation frequency greater than the highest frequency in the information component.

29. The system of claim 26 wherein the means for applying a signal comprises an oscillator having a modulation frequency which causes no intermodulation products with any frequency in the information component to fall within the informational bandwidth.

30. The system of claim 26 wherein the means for applying a signal comprises a constant amplitude oscillator.

31. The system of claim 26 wherein the means for applying a signal comprises means for generating a frequency modulated signal.

32. The system of claim 26 wherein the means for applying a signal comprises means for generating noise.

33. The system of claim 26 wherein the means for applying a signal comprises means for generating pseudo-random digital signals.

34. The noise and distortion suppression system of claim 26 wherein the signal comprises a plurality of frequencies.

35. The noise and distortion suppression system of claim 26 wherein the signal has a frequency in the range from 1 KHz to 300 MHz.

36. The noise and distortion suppression system of claim 26 wherein the signal has a frequency in the range from 1 KHz to 200 KHz.

37. A method for suppressing noise and distortion in a fiber-optic communications system having a semiconductor laser with an optical output coupled to a remote receiver, the method comprising the steps of:
modulating the laser optical output;
applying a chirp generating signal to the laser for changing the instantaneous frequency of light from the laser for minimizing noise and distortion due to reflections;

transmitting light from the laser to the receiver by way of an optical fiber; and demodulating the laser optical output at the receiver for producing a low noise electrical output signal.

38. The method of claim 37 further comprising the step of applying a predistorted signal to the laser for canceling laser distortion caused by modulating the laser optical output with the chirp generating signal.

* * * * *